April 21, 1931. H. SCHLAICH 1,802,278
INDICATING MEANS
Filed Oct. 30, 1926 2 Sheets-Sheet 1
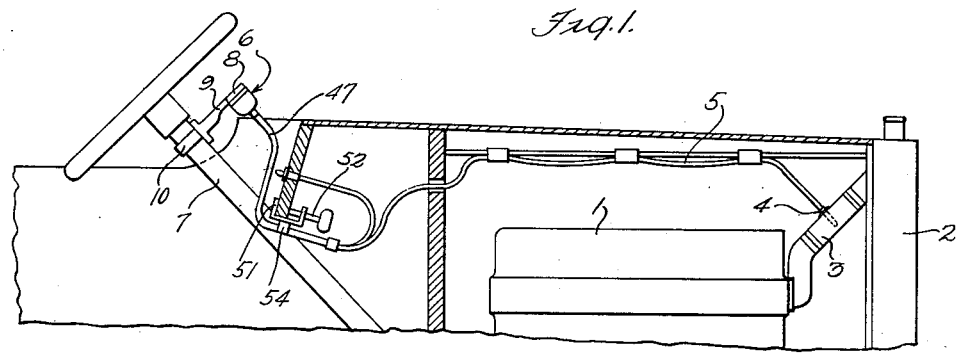

April 21, 1931.   H. SCHLAICH   1,802,278
INDICATING MEANS
Filed Oct. 30, 1926   2 Sheets-Sheet 2
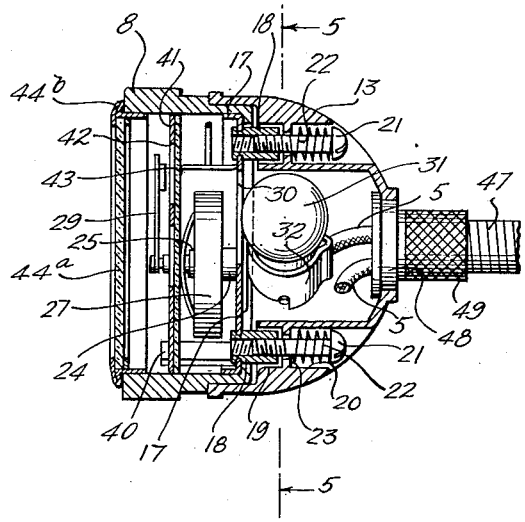
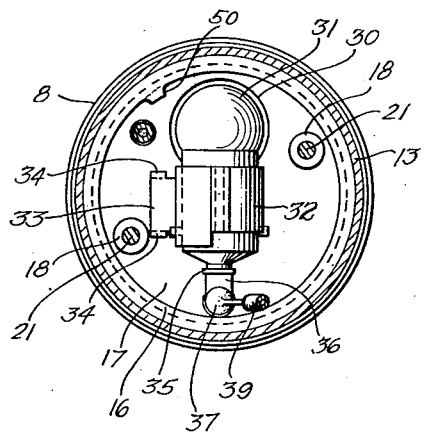
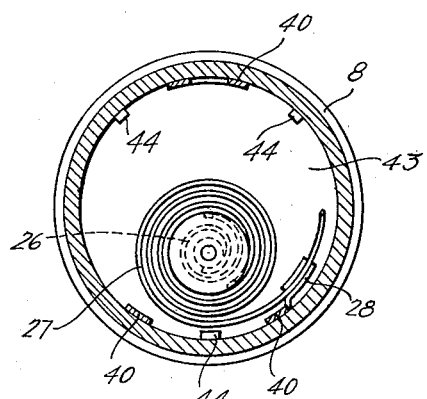
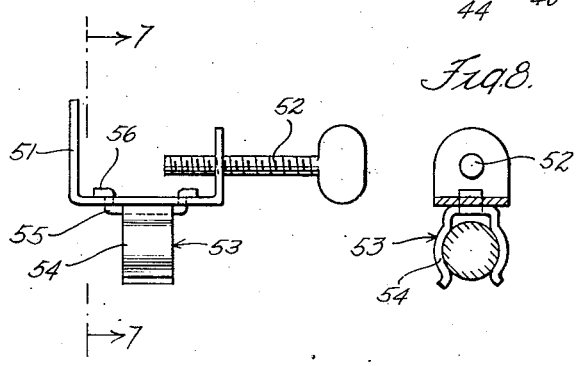
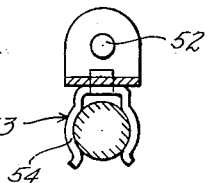
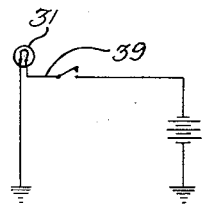
INVENTOR
HERMAN SCHLAICH
BY Moses & Nolte
ATTORNEY Patented Apr. 21, 1931

1,802,278

UNITED STATES PATENT OFFICE

HERMAN SCHLAICH, OF LONG ISLAND CITY, NEW YORK

INDICATING MEANS

Application filed October 30, 1926. Serial No. 145,358.

This invention relates to instruments for indicating motor operating conditions to the driver of a motor vehicle and more particularly to heat responsive instruments of the distance type.

It is an object of the invention to provide an instrument of this character having illuminating means embodied in the indicating part thereof so that the indications can be read without difficulty at night.

It is a further object of the invention to make provision in an instrument of the kind referred to for adjusting the indicating mechanism and its operating means angularly so that the indicating scale will be upright with reference to the observer, and for so mounting the light that it will necessarily be adjusted at the same time so as to be maintained in cooperative relation with the other adjustable parts of the mechanism.

Other objects and advantages will hereinafter appear.

In the drawings forming a part of this specification:

Figure 1 is a fragmentary, sectional, side elevation of an automobile equipped with an indicating instrument embodying features of the present invention;

Figure 2 is a face view of the indicating part of the instrument, together with supporting means for adjustably mounting it on the steering column of the motor vehicle;

Figure 3 is a sectional, side elevation taken on the line 3—3 of Figure 2;

Figure 4 is a horizontal section through the indicator, certain parts which protrude above the section plane being shown complete for clearness;

Figure 5 is a vertical section on the line 5—5 of Figure 4 looking in the direction of the arrows;

Figure 6 is a vertical section on the line 6—6 of Figure 3 looking in the direction of the arrows;

Figure 7 is a detail elevation showing a clip and bracket used in supporting the distance tube and the electrical conductor from the dashboard;

Figure 8 is a section on the line 8—8 of Figure 7 looking in the direction of the arrows; and Figure 9 is a diagram showing the light circuit.

The motor vehicle to which the instrument is shown applied may be of any usual construction comprising a water-cooled motor 1, radiator 2 and radiator return hose 3 for conducting the heated water from the jackets of the motor to the radiator. A temperature responsive element 4, which in the embodiment shown comprises a bulb filled with a heat expansible fluid, is mounted in the hose 3 so that it will respond to the temperature of the water passing from the water jackets to the radiator or is otherwise suitably associated in thermal relationship to the motor. The temperature responsive element 4 is connected through an armored capillary tube 5 to an indicator 6 supported, in the illustrative embodiment, from the steering column 7 of the vehicle.

The indicator casing comprises a collar 8 provided with a laterally projecting arm 9 which may be clamped in any desired position on the steering column by means of a metallic strap 10 which encircles the steering column. The strap has its ends received between the arm 9 and a cooperating clamping block 11. A screw 12 is passed through the arm 9 and through both ends of the strap 10, and is threaded into the clamping block 11 so that the strap 10 can be tensioned about the steering column by turning the screw 12 to draw the clamping block 11 toward the arm 9. With this arrangement the arm 9 can be adjusted angularly about the steering column when desired by loosening the strap 10.

It will be observed that such adjustment of the arm 9 changes the angular position of the collar 8 with reference to the driver. Since it is desirable to maintain the indicating part of the mechanism in an upright position so that it can be easily read by the driver, provision is made for angularly adjusting the indicating mechanism to be described, relative to the collar 8.

In addition to the collar 8 the indicator casing comprises a bell-shaped shell 13 which fits onto a reduced rear end 14 of the collar 8 and abuts a shoulder 15 at the forward end of such reduced portion. The shell 13 is rotatable relative to the collar 8. The collar 8 has a short inturned flange 16 at its rear end which supports, but is not secured to, a frame 17 on which the operating and indicating part of the instrument is mounted. This frame is provided with two rearwardly extending, internally threaded posts 18 whereby the frame may be secured to the shell 13 for rotation in unison therewith. The shell 13 is provided with bores 19 for receiving the posts and with aligned bores 20 in which screws 21 may be inserted for threading into the posts 18. Coil springs 22 are mounted in the bores 20 between the heads of screws 21 and abutments 23 at the inner ends of the bores 20. By turning the screws 21 the frame 17 may be caused to bear rearwardly against the flange 16 of the collar 8, and the forward end of the shell 13 will be caused to exert counterpressure in a forward direction against the shoulder 15 of the collar 8. This pressure is yieldingly exerted through the springs 22 so that by turning the screws 21 to adjust the stress of said springs the shell 13 and collar 8 may be held frictionally against relative rotation with any degree of force desired. From the foregoing description, it will be appreciated that the frame 17 may be adjusted angularly in the collar 8 by seizing and turning the shell 13, and that it will be held in adjusted position by the clamping force exerted through the springs 22.

The frame 17 supports at one side of its center a bearing post 24 on which a hub 25 is pivotally mounted. This hub is connected to the inner end of a compensating spring 26 and the compensating spring in turn is connected at its outer end to the inner end of a spiral Bourdon coil 27. The Bourdon coil is wound substantially concentrically around the axis of the bearing post 24 and is anchored at its outer end in lugs 28 struck up from the frame, being connected at such outer end with the capillary tube 5. Changes in temperature of the temperature responsive element 4 cause the Bourdon coil and compensating spring to unwind and turn the hub 25. The hub 25 has fixed upon it an indicating pointer 29.

It will be noted that the Bourdon coil is positioned at one side of the frame 17, leaving the other side of the frame substantially free of obstruction. At this unobstructed portion of the frame an opening 30 is provided and an electric light bulb 31 is mounted on the rear of the frame to lie directly behind this opening. The mounting for the electric light bulb comprises a socket 32 having an extending arm 33 provided with fingers 34 which are passed forwardly through slots in the frame and upset to anchor the socket. The socket forms the rim terminal for the electric light bulb. A center terminal 35 projects beneath the socket and is provided with a downturned arm 36 which is secured to the frame 17 by a rivet 37. The rivet 37 and the arm 36 are insulated from the frame by insulating washers 38. An electrical conductor 39 is connected to the rim terminal by solder or other suitable means. The frame 17 is provided with forwardly extending fingers 40 which interfit with notches in the periphery of an opaque face plate 41 to fixedly support the face plate. This face plate is provided with an arcuate opening 42 which lies in front of the light bulb 31 and the opening 30 of the frame 17. A translucent scale plate 43 is mounted upon the rear of the face plate 41 with its scale showing through the opening 42 of the face plate. The scale plate is held in place by fingers 44 bent rearwardly from the periphery of the face plate and curled around the periphery of the scale plate. A cover glass 44a carried by a ring 44b, is detachably mounted in the front of the collar 8.

It will be seen that the frame 17 carries the Bourdon coil, the pointer, the scale plate, and the light, and that the parts are so arranged that the light can shine through the frame onto the scale without obstruction. As a result of this arrangement the turning of the shell 13 is effective to shift the scale into upright position with reference to an observer, and at the same time to shift the pointer, the operating mechanism and the light correspondingly.

The pointer 29 has a circular enlargement 45 adjacent its outer end portion which carries a small, transparent, colored disc 46. This disc is far enough out toward the end of the pointer to operate over the opening 42 so that light passing through the scale plate passes through the colored disc, also rendering it conspicuous.

The shell 13 is provided with a circular central opening at its rear end through which both the electrical conductor 39 and the capillary tube 5 are led. A flexible metal hose 47 is secured in alignment with this opening by means of a flanged sleeve 48 and a coupling 49, and constitutes a protective conduit for both the electrical conductor and the capillary tube. With this arrangement the conductor and capillary tube are led axially into the shell 13 so that rotation of the shell does not tend to produce bodily movement of these elements, and hence does not subject them to abrasion. Excessive twisting of the conductor and capillary tube are prevented by means of a stop 50 which projects inwardly from the flange 16 of the collar 8 and limits rotative adjustment of the frame 17 by engaging the posts 18 thereon.

The electrical conductor 39 extends to the rear of the dashboard and may be connected for control by the ignition switch of the motor in a manner to cause the bulb 31 to be lighted whenever the switch lever 39a is operated to make the ignition circuit effective. By this arrangement the instrument light serves not only to illuminate the dial for permitting the motor temperatures to be read easily, but it additionally affords a conspicuous, telltale signal to indicate whether or not the ignition is turned on. The light circuit is, however, distinct from the ignition circuit, the light circuit being arranged as shown in Figure 9. The usual battery is grounded at one terminal. The current passes from the other terminal through a switch controlled by switch lever 39a and conductor 39 to the center terminal of the light bulb, thence through the filament and the rim terminal, which is grounded through the frame 17 and the instrument casing.

For leading the capillary tube 5 and the conductor 39 around the dashboard instead of through it, and for supporting these elements so that they will not be chafed in use, the flexible conduit 47 is supported from the lower edge of the dashboard by the combined bracket and clip shown in Figures 7 and 8. An U-shaped bracket 51 embraces the lower edge of the dashboard and is clamped thereto by means of a finger screw 52 threaded through one of its legs. A clip 53 comprises spring fingers 54 which embrace the flexible conduit. The base 55 of this clip is provided with fingers 56 which pass through the base of the U-shaped bracket 51 and are turned over to secure the bracket and clip together. With this arrangement the mounting of the instrument can be very quickly and conveniently effected, and the length of the flexible conduit which it is necessary to have extend in front of the dashboard for the particular installation can be adjusted simply by withdrawing the conduit from the clip until the installation has been completed, and then re-inserting it in the clip.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. In an indicating instrument, in combination, a casing, a translucent dial, a translucent indicator cooperative with said dial, and a light in the casing behind the dial and the indicator, said indicator showing a different color than said dial.

2. In an indicating instrument, in combination, a casing, a frame in the casing, an indicator, indicator operating mechanism mounted on the front of the frame at one side thereof, a light mounted on the back of the frame out of line with said operating mechanism and rearward thereof, said frame having an opening in line with the light, and a dial having a translucent indicia bearing portion in line with the light and the opening in the frame.

3. In a distant type indicating instrument for motor vehicles, in combination, a temperature responsive element exposed to the heat of the vehicle motor, a distant indicating mechanism responsive thereto comprising a casing, indicating mechanism within the casing, a light within the casing, an electrical conductor connected to the light, a capillary tube connecting the temperature responsive element with the indicating mechanism, and a flexible conduit connected to the casing and forming a common protective housing and support for the electrical conductor and the capillary tube.

4. In a distant type indicating instrument for motor vehicles, in combination, a temperature responsive element exposed to the heat of the vehicle motor, a distant indicating mechanism responsive thereto comprising a casing, indicating mechanism within the casing, a light within the casing, an electrical conductor connected to the light, a capillary tube connecting the temperature responsive element with the indicating mechanism, a flexible conduit connected to the casing and forming a common protective housing and support for the electrical conductor and the capillary tube, an adjustable bracket secured to a fixed vehicle part, and a spring clip carried by the bracket for gripping and supporting the flexible conduit.

5. In a distant type indicating instrument for motor vehicles, in combination, a temperature responsive element exposed to the heat of the vehicle motor, a distant indicating mechanism responsive thereto comprising a casing, indicating mechanism within the casing, a light within the casing, an electrical conductor connected to the light, a capillary tube connecting the temperature responsive element with the indicating mechanism, a flexible conduit connected to the casing and forming a common protective housing and support for the electrical conductor and the capillary tube, and means holding the flexible conduit to the lower margin of the dashboard of the vehicle.

6. In an indicating instrument, in combination, a casing comprising a relatively fixed section and a section rotatable relatively thereto, said casing enclosing an indicating pointer, a translucent dial behind said pointer, pointer operating mechanism behind said dial, a light behind the dial and at one side of the operating mechanism, and means compelling the pointer, the dial, the operating mechanism and the light to move in unison with the rotatable casing section and with each other.

7. In an indicating instrument, a relatively fixed casing section, an indicating element, a translucent dial behind said element, operating mechanism therefor behind said dial, a light behind the dial and out of line with the operating mechanism, and means for angularly adjusting the indicating element, the dial, the operating mechanism and the light as a unit relative to the fixed casing section.

8. In an indicating instrument, a relatively fixed casing section, a casing section rotatable relatively thereto, an indicating pointer, a translucent dial behind the pointer, pointer operating mechanism behind the dial comprising a Bourdon coil, a light behind the dial and out of line with the operating mechanism, means compelling the pointer, the dial, the operating mechanism and the light to move in unison with the rotatable casing section, a capillary tube connected to the Bourdon coil, an electrical conductor connected to the light, and a conduit leading the capillary tube and the electrical conductor into the rotatable casing section along the axis thereof.

9. In an indicating instrument, an indicating pointer, an opaque face plate behind the pointer having a light transmitting opening therein, a translucent dial plate immediately behind the face plate, pointer operating mechanism behind the face and dial plates and out of line with the opening in the former, a light in line with the opening in the face plate, and a casing enclosing all of the parts referred to.

10. In an indicating instrument, a casing comprising a section provided with a laterally extending supporting arm, means for mounting the arm on a support in different angularly adjusted positions, a second casing section rotatably adjustable with reference to the first, indicating mechanism including a dial and a pointer adjustable by rotation of the second casing section, and means for yieldingly resisting relative rotation of the casing sections, comprising spring means pressing said sections into frictional engagement with each other, and means for adjusting the pressure of said spring means.

11. In an indicating instrument, a casing comprising a front section provided with a laterally extending supporting arm, means for mounting the arm on a support in different angularly adjusted positions, a rear casing section rotatably adjustable with reference to the front section, indicating mechanism in the casing including a dial, a pointer, and a frame on which the dial and pointer are mounted, said front casing section having an abutment engaging the rear face of the frame, headed screws extending through the rear casing section and connecting it to the frame, and springs interposed between the heads of the screws and the rear of the rear casing section for yieldingly pressing the frame and the rear casing section into frictional engagement with the front casing section, the screws being operable to adjust the stress of the springs and thereby to adjust the resistance of the casing sections to relative rotation.

12. In an indicating instrument, in combination, a casing, indicator operating mechanism mounted in the casing at one side thereof, a light fixedly mounted in the casing out of line with the operating mechanism, a dial having a translucent bearing portion in line with the light, and an opaque portion and an indicator operating mechanism across said translucent dial portion said opaque portion concealing said operating mechanism.

13. In an indicating device, in combination, a translucent dial, indicator means operating across the dial, indicator operating mechanism at the back of the dial, and dial illuminating means also at the back of the dial and at the back of said operating mechanism, said indicator operating means and said lighting means being arranged and disposed with reference to one another to avoid shading the indicating part of the dial.

14. In an indicating instrument, an indicating pointer, a face behind said pointer, said face comprising a relatively opaque portion and a light transmitting portion, indicia carried by said light transmitting portion, pointer operating mechanism behind the opaque portion and out of line with the light transmitting portion, a light behind the face for illuminating said light transmitting portion, and a casing enclosing all of the parts referred to.

In testimony whereof I have affixed my signature to this specification.

HERMAN SCHLAICH.